United States Patent [19]

Pekko

[11] 4,292,370
[45] Sep. 29, 1981

[54] MOISTURE AND TEMPERATURE RESISTANT POLARIZING LAMINATION

[75] Inventor: John A. Pekko, Whittier, Calif.

[73] Assignee: Avery International Corporation, San Marino, Calif.

[21] Appl. No.: 100,933

[22] Filed: Dec. 6, 1979

[51] Int. Cl.³ .............................................. G02F 1/13
[52] U.S. Cl. ........................................ 428/355; 428/1; 428/40; 428/424.4; 428/424.8; 428/516; 428/520
[58] Field of Search ...................... 428/1, 40, 516, 520, 428/424.4, 424.8, 355; 350/160 LC

[56] References Cited

U.S. PATENT DOCUMENTS 2,524,286 10/1950 Dreyer .................................... 428/1
4,025,688 5/1977 Nagy ....................................... 428/1

Primary Examiner—Marion McCamish
Attorney, Agent, or Firm—Poms, Smith, Lande & Rose

[57] ABSTRACT

A new moisture resistant polarizing lamination is disclosed which utilizes polypropylene as the protective layers. A polarizing film of polyvinyl alcohol which has been stretched and treated with iodine is protected against moisture and structurally supported by at least one layer of polypropylene. The polypropylene is bonded to the polyvinyl alcohol by adhesives which do not interfere with the polarizing effects of the lamination. The polypropylene may have a bonding layer already attached thereto which is covered by a protective film. The protective film is prevented from becoming secured to the bonding layer by a release agent placed between the protective film and bonding layer. The protective film is removed just prior to bonding of the polypropylene to the polyvinyl alcohol. Use of polypropylene films that are 0.002 inch thick is disclosed. Polypropylene films of this thickness do not adversely affect the polarizing qualities of the lamination. The PVA polarizing film in a sandwich of polypropylene may be provided with one exterior adhesive layer for ease in securing the lamination in its desired final location.

3 Claims, 2 Drawing Figures

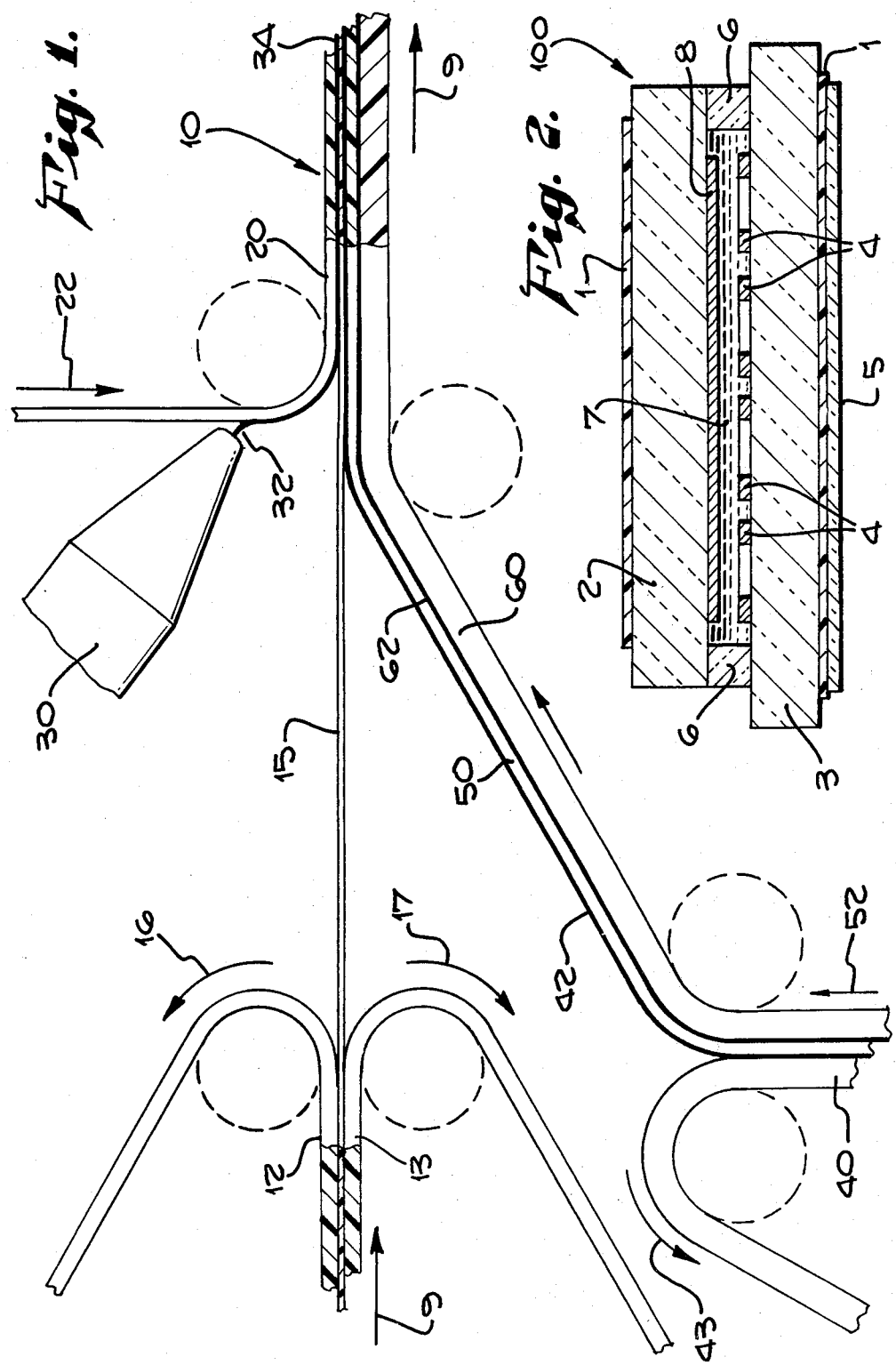

MOISTURE AND TEMPERATURE RESISTANT POLARIZING LAMINATION

BACKGROUND OF THE INVENTION

The present invention relates to polarizing laminations, of the type which may be used as the polarizing elements in optical systems, such as liquid crystal displays.

Polyvinyl alcohol (PVA) has been commonly used as a polarizing film. Polyvinyl alcohol when stretched and treated with a halide provides a film with polarizing qualities. Polyvinyl alcohol is water soluble and thin films of PVA are structurally weak. Accordingly, prior art workers in the field found it necessary to laminate the PVA film to a structurally strong substrate as it was being processed. Also, some crystalline materials were found to produce undesired optical effects including colorful rainbow and dispersive effects. Accordingly, during the processing of the PVA film supporting films of noncrystalline material were used. Initial laminates such as glass and cellulosic materials were widely used. These laminates tended to be bulky and made application and use of the polarizing laminations difficult.

The modern trend in the field of polarizing laminations has been toward the development of a film which is as thin as possible while still protecting the polyvinyl alcohol from moisture and providing an adequate structural support. Cellulose acetate butyrate is a widely used material for laminating the polyvinyl alcohol. However, problems have been encountered in that the cellulose acetate butyrate/PVA laminate is moisture sensitive and tends to curl and separate from the polyvinyl alcohol along the edges of the film in the presence of heat and/or humidity drawing air into the pressure sensitive adhesive between the two layers. Moisture then attacks the water soluble polyvinyl alcohol along the edges of the film, which results in a polarizing lamination of inferior optical qualities, and dissatisfaction on the part of the owner of equipment including the film. Additionally, moisture attacking the cellulose acetate butyrate causes bubbling and curling at the interface with the polarizing material or other substrate.

Acrylic type films have recently been used with some success; however, thin acrylic films tend to be brittle and crack easily. They also tend to curl when exposed to high humidity. The cracking also results in moisture attack on the polyvinyl alcohol having the undesired results noted above.

It is therefore an object of the present invention to disclose and provide a laminating material with sufficient strength when used in thin films to provide support and protection for polyvinyl alcohol films.

Another object of the present invention is to disclose and provide a polarizing lamination film which is not brittle and does not exhibit peeling characteristics around the edges of the lamination.

A further object of the present invention is to disclose and provide an economical method for applying an improved lamination material to polyvinyl alcohol.

An additional objective of the present invention is to disclose and provide an ultrathin polarizing lamination which is particularly useful in liquid-crystal display applications.

The proposed lamination material should be structurally strong even in thin layers as thin as two thousandths of an inch while protecting the polyvinyl alcohol from moisture and providing the required structural support. The new lamination material must not interfere with the optical qualities of the system utilizing the polarizing layer.

SUMMARY OF THE INVENTION

The present invention discloses the surprising discovery that polypropylene fulfills all the requirements of a thin laminating material for the protection of polyvinyl alcohol. Polypropylene in films as thin as one thousandths of an inch provide adequate structural support and moisture protection for polyvinyl alcohol films when applied to liquid-crystal displays without the disadvantages of brittleness and peeling experienced by prior art materials. Due to polypropylene's crystalline character, it has heretofore been thought of as an unusable lamination material because of probable adverse effects on the optical properties of the optical systems in which the films are employed. One aspect of the present invention involves the discovery that polypropylene in thin films when applied to polyvinyl alcohol does not appreciably affect the optical qualities of, for example, a liquid crystal display thus polarized.

In the past, polyvinyl alcohol has been supplied commercially from manufacturers in securely bonded laminated form. For example, the polyvinyl alcohol is usually supplied in a laminated form bonded to films of cellulose acetate butyrate, cellulose triacetate, glass or acrylic films. Recently, at least in part as a result of suggestions of the present inventor, polyvinyl alcohol is being made available as a film which is loosely held between layers of a protective material such as ethylene vinyl acetate, cellulose triacetate or Mylar. Now, using this "free" PVA polarizing film, thin layers of polypropylene may be bonded thereto to produce a new polarizing lamination having all of the desired qualities as set forth above.

The polypropylene may be bonded to one side only of the polarizing film. This provides a relatively thin polarizing lamination for application to various support structures, such as glass. The polypropylene may also be bonded to both sides of the polarizing film to provide a thicker lamination which is fully heat and moisture resistant and also easy to handle for processes in which the polypropylene and polarizing film are to be stored, transported, or otherwise handled prior to final application or use.

The above-stated objects and others are accomplished by the present invention by a polarizing film of polyvinyl alcohol which is laminated with layers of polypropylene, preferably high strength, high density crystalline polypropylene. In general, the process involves utilizing polarizing polyvinyl alcohol which has been loosely protected between protective plastic layers, such as those mentioned above. Adhesive is applied to the surface of the polypropylene film layer with the polyvinyl alcohol being bonded thereto as its protective layer is removed. Alternatively, the polypropylene may be supplied having adhesive already applied to its surface and if desired, with the adhesive being protected by a protective layer, such as plastic, for example Mylar or polyester and a release agent. As the protective layer is removed from the polyvinyl alcohol, the plastic protective layer is removed from the polypropylene. The removal of the plastic protective layer exposes the bonding layer which is present on the polypropylene. The polypropylene is then bonded to the polyvinyl alcohol.

Additionally, the polypropylene may be sandwiched between the layers of adhesive and plastic protective layers. When the polypropylene is applied to the polyvinyl alcohol, which already has a protective layer of polypropylene on the opposing side, only one protective layer of plastic is removed as the polypropylene is bonded to the polyvinyl alcohol. This conveniently leaves an outer layer of adhesive protected by plastic which can be used for subsequent application of the polyvinyl alcohol/polypropylene laminate to liquid-crystal displays or other desired surfaces.

Alternatively, a reflective metallic film, such as Aluminum foil may be bonded to one side of a polarizing film with polypropylene being bonded to the opposite side. This configuration is useful in certain types of liquid crystal displays and other optical systems involving the need for both polarizing and reflection properties.

The polypropylene used in this method is much thinner than prior art laminations such as cellulose acetate butyrate. This results in thinner films which provide better clarity, are less stiff and less brittle. This new high performance polarizing laminate provides manufacturing flexibility not possible with the prior art films. Also, unlike prior cellulosic laminations, polypropylene is resistant to moisture, and does not deteriorate or curl at the edges from such effects.

A more complete understanding of the present invention, as well as a recognition of additional objects and advantages will be afforded to those skilled in the art from a consideration of the following detailed description of the exemplary embodiments thereof. Reference will be made to the appended sheets of drawings which will first be discussed briefly.

BRIEF DESCRIPTION OF THE DRAWINGS:

FIG. 1 is a simplified diagram of the method for preparing the preferred embodiment of the polarizing lamination of the present invention; and FIG. 2 is a simplified cross-sectional view of a liquid-crystal display demonstrating an application of the laminated polarizing film of the present invention.

DETAILED DESCRIPTION

Referring to FIG. 1, a polarizing film shown at 15 is introduced into a laminating machine or other equipment commonly utilized in applying adhesive and film coating materials. The polarizing film 15 is continually moved in the direction indicated by arrows 9. In the preferred exemplary embodiment of the present invention, the polarizing film 15 utilized is polyvinyl alcohol which has been prepared by stretching and impregnating with iodine. It should be noted that other polarizing films may be substituted for the polyvinyl alcohol polarizing film if desired. Possible alternative polarizing films include polyvinyl chloride, polyvinyl butyrate and polarizing films designated as H sheet, K sheet and L sheet available from Polaroid Corporation.

The polyvinyl alcohol film 15 utilized in the present invention is available in thicknesses ranging from 0.0003 inch to 0.0005 inch. The polyvinyl alcohol polarizing film 15, as now supplied, is held and protected between two loosely secured films 12, 13, of plastic material as discussed above.

In the preferred exemplary embodiment of the present invention, the protective layers 12 and 13 are removed from the free polyvinyl alcohol film 15 prior to application of the protective laminating material. Polypropylene in a crystalline form, such as isotactic form, is the preferred laminating material of the present invention. Less crystalline polypropylene may be utilized if desired, however, the degree of structural strength and flexibility may be lessened. Polypropylene films are widely available commercially. Polypropylene available from Diacel Corporation of Japan as 2 mil biaxially oriented crystalline polyprophylene may be employed in the implementation of the present invention. Diacel Corporation and U.S. suppliers also distribute biaxially oriented polypropylene in films having a thickness of 0.00125 inch. Although 0.002 inch thick polypropylene is preferred for use in the present invention, 1 and 1¼ mil films may also be used.

In the preferred exemplary embodiment of the present invention, the polarizing laminating film shown generally at 10 in FIG. 1 is composed of a polypropylene layer 20 which is bonded to a polarizing polyvinyl alcohol film 15 by a bonding agent layer 34. The adhesive used for the bonding agent can be any of the urethane adhesives, such as those available from Morton Chemical Company of Chicago, or a pressure sensitive acrylic adhesive, or any other suitable adhesive which does not interfere to any significant extent with the optical properties of the polyvinyl alcohol and provides a secure and preferably permanent bond. A second polypropylene film 50 is bonded to the opposite side of the polyvinyl alcohol 15 by bonding agent layer 42 which can also be any of the above mentioned adhesives. On the exterior surface of the polypropylene 50 an adhesive layer 62 is provided for securing the entire completed laminated polarizing film 10 to a desired surface. This adhesive can also be from the above mentioned class of adhesives, however, pressure sensitive acrylic adhesives are preferred. A protective release coated layer 60 is placed over the adhesive layer 62 to protect the adhesive 62 prior to application of the polarizing lamination 10 to the desired surface. Having thus described the polarizing lamination 10 of the present invention, the following will be a discussion of the application of the polypropylene laminating layers 20 and 50 to the free polyvinyl alcohol film 15 during the lamination process.

The polypropylene protective films may be applied in any number of ways and in many different configurations. For example, the preferred exemplary embodiment of the present invention shown in FIG. 1 shows the polyvinyl alcohol 15 as sandwiched between two layers of polypropylene 20 and 50 with one layer of polypropylene 50 being supplied with an exterior adhesive layer 62 for application purposes. Another possible configuration would sandwich the polyvinyl alcohol between a polypropylene layer and an adhesive layer. This type of lamination is useful when the polyvinyl alcohol is to be applied directly to a surface which itself can protect the polyvinyl alcohol on one side.

Additionally, a metallic reflecting film, such as aluminum foil, may be substituted in place of either polypropylene layer 20 or 50 to provide a reflective display if desired.

FIG. 1 illustrates two possible application techniques for laminating the polypropylene to the polyvinyl alcohol. The first involves taking free polypropylene 20 and continually introducing it to contact the moving polyvinyl alcohol 15 as indicated by arrow 22. An adhesive applicator 30 introduces adhesive on the polypropylene 20 at 32 which forms a bonding layer 34 for bonding the polypropylene 20 to the polyvinyl alcohol 15. A second method involves the application of polypropylene 50 which has been previously sandwiched between a pressure sensitive bonding layer 42 and a pressure sensitive adhesive layer 62. The adhesive 62 and bonding 42 layers are protected, prior to application, by a protective layer of plastic, such as Mylar, which is a pthalate polyester. Although the use of Mylar as an adhesive protector is preferred, any type of adhesive protective film may be utilized which provides for easy removal of the adhesive protective film and presents a smooth adhesive layer to eliminate (or to reduce) possible air entrapment at the glass/adhesive interface prior to application of the adhesive for bonding purposes. Release layers, not shown, are provided between the Mylar films 40, 60 and the adhesives at 42, 62. These release layers allow complete and easy removal of the Mylar films 40 and 60 from the adhesives 42, 62. The release layer can be composed of a silicone-containing material or any compound which can hold the protective layer on the adhesive while still allowing easy removal of the protective layer without damaging the adhesive. The Mylar protective film 40 is peeled away from the bonding agent layer 42 as indicated by arrow 43 just prior to application of the polypropylene layer 50 to the polyvinyl alcohol 15. This allows clean, easy and quick application of the polypropylene to the polyvinyl alcohol. The outer Mylar protective layer 60 is not removed until such time as the entire polarizing lamination is ready to be applied to a liquid-crystal display or other suitable surface.

For high production applications, the extra protective layer 40 would normally not be used, and layer 50 would be directed bonded to PVA film 15 by adhesive supplied from an applicator.

FIG. 2 shows the polarizing lamination film 1 of the present invention as it is used in a liquid-crystal display which is shown generally at 100. The liquid-crystal display 100 is of the type commonly used in the prior art and is composed of two parallel support plates 2 and 3 which are spaced apart by spacing members 6 wherein the spacing members 6 also function to contain and seal the liquid-crystal 7. The liquid-crystal 7 may be a schiff chloride basic type, azoxy type, ester type or biphenyl type. Electrodes 4 and 8 cover the inner surfaces of the support plates 2 and 3 and are responsible for changing the optical qualities of the liquid-crystal. The polarizing lamination film 1 of the present invention is applied to the top and bottom of the liquid-crystal display. A reflective film 5 is provided when the liquid-crystal display is operated in the reflective mode. However, if it is desired to operate the liquid-crystal display in the transmissive mode, the reflective film 5 may be removed. The liquid-crystal display as depicted herein is utilized for demonstrative purposes only to indicate one illustrative application of the polarizing lamination film of the present invention. While the liquid-crystal display itself is well known, it is in connection with this type of application, on calculators and watches, for example, that the moisture resistance, strength, flexibility and reduced thickness of the film of the present invention, are particularly advantageous.

As mentioned in the Background of the Invention, prior art workers have utilized different substances to protect the polarizing film. Three patents which are exemplary of such prior art substances are U.S. Pat. No. 4,043,639 issued Aug. 23, 1977, to S. Matsuyama et al.; U.S. Pat. No. 4,061,418 issued Dec. 6, 1977, to R. Poensgen and U.S. Pat. No. 2,524,286 issued Oct. 3, 1950 to J. F. Dreyer. The Matsuyama and Poensgen patents disclose polarizing laminations useful for liquid crystal display applications. The Matsuyama patent discloses the use of polycarbonate, cellulose and "crylic" resins as the protective lamination for polyvinyl chloride polarizers. The Poensgen patent discloses a cellulose acetate butyrate protective lamination for polyvinyl alcohol polarizing films used in connection with liquid crystal displays. The Dreyer patent is directed to polarizing films in general. This patent discloses the use of various protective laminations such as cellulose acetate, thermoplastic vinyl resins such as vinyl chloride-vinyl acetate copolymers, methyl methacrylate or polystyrene. As discussed in the "Background of the Invention" section of this specification, the cellulose coatings have moisture absorption and edge peeling problems, the acrylic supporting laminates are unduly brittle in thin assemblies, and the other proposed laminations are rigid, and thus not suitable for flexible and general purpose applications to which the present invention is directed.

Although the preferred use of the polarizing lamination film of the present invention is for applications to liquid-crystal displays, because of its thin character, high strength, impermeability to moisture, flexibility and clarity, many other applications will be apparent to those skilled in the art.

Having thus described exemplary embodiments of the present invention, it should be noted by those skilled in the art that the within disclosures are exemplary only and that various other alternatives, adaptations and modifications may be made within the scope of the present invention. Thus, by way of example and not of limitation, if desired only a single outer layer of polypropylene may be used with the PVA film being directly secured to the display assembly, for example on its other side, or to another flexible film. Additionally, ultra-violet absorbers may be added to the adhesive for protecting the polyvinyl alcohol and the LCD display from harmful ultra-violet rays found in sunlight. Accordingly the present invention is not limited to the specific embodiments as illustrated herein.

What is claimed is:
1. A moisture resistant lamination comprising:
 a polyvinyl alcohol polarizing film;
 protective polypropylene films on both sides of said polyvinyl alcohol polarizing film; and
 transparent urethane bonding agent layers firmly bonding said polypropylene films to the two sides of said polarizing film.
2. A moisture resistant polarizing lamination comprising:
 a polarizing film comprising polyvinyl alcohol treated with iodine sandwiched between two protective polypropylene films; and
 bonding agent layers between said polarizing film and polypropylene films for bonding said polypropylene films to said polarizing film wherein said bonding agent layer is a urethane adhesive or a pressure sensitive acrylic adhesive.
3. A lamination according to claim 2 further including an adhesive layer on the exterior surface of at least one polypropylene film for securing said lamination to a support structure wherein said adhesive layer is a urethane adhesive or a pressure sensitive acrylic adhesive.

* * * * *